United States Patent [19]

Miles

[11] 3,943,001

[45] Mar. 9, 1976

[54] SILVER SULFIDE CATHODE FOR LIQUID AMMONIA BATTERIES AND FUEL CELLS CONTAINING SULFUR AND $H_2S$ IN THE ELECTROLYTE

[75] Inventor: Melvin H. Miles, Murfreesboro, Tenn.

[73] Assignee: The United States of America as represented by the Secretary of the Navy, Washington, D.C.

[22] Filed: July 5, 1973

[21] Appl. No.: 376,784

Related U.S. Application Data

[63] Continuation-in-part of Ser. No. 163,638, July 19, 1971, abandoned.

[52] U.S. Cl.............................. 136/6 LN; 136/86 R
[51] Int. Cl.² ........................................ H01M 10/00
[58] Field of Search ............. 136/86 A, 6 LN, 86 R

[56] References Cited
UNITED STATES PATENTS

| | | | |
|---|---|---|---|
| 2,937,219 | 5/1960 | Minnick et al. | 136/6 LN |
| 2,996,562 | 8/1961 | Meyers | 136/6 LN |
| 3,121,028 | 2/1964 | Story | 136/6 |
| 3,248,265 | 4/1966 | Herbert | 136/6 LN |
| 3,408,229 | 10/1968 | Posey et al. | 136/6 LN |

Primary Examiner—G. L. Kaplan
Assistant Examiner—H. A. Feeley
Attorney, Agent, or Firm—Richard S. Sciascia; Joseph M. St.Amand

[57] ABSTRACT

A rechargeable silver sulfide cathode for batteries and fuel cells using liquid ammonia electrolytes.

5 Claims, 3 Drawing Figures

SILVER SULFIDE CATHODE FOR LIQUID AMMONIA BATTERIES AND FUEL CELLS CONTAINING SULFUR AND H₂S IN THE ELECTROLYTE

CROSS REFERENCE TO RELATED APPLICATION

This is a continuation in part of copending patent application, Ser. No. 163,638 filed July 19, 1971 now abandoned for Silver Sulfide Cathode for Liquid Ammonia Batteries and Fuel Cells. Reference is also made to related copending patent application, Ser. No. 98,117 filed Dec. 14, 1970, now abandoned for Hydrazine Anode in Liquid Ammonia Electrolytes.

BACKGROUND OF THE INVENTION

This present invention relates to the practical use of silver sulfide as a rechargeable cathode for batteries and fuel cells utilizing ammonia electrolytes.

The attractiveness of liquid ammonia electrolytes for batteries is largely due to the comparatively low freezing point of ammonia and to the high conductivity of electrolytes in this solvent. Such properties provide for efficient operation of liquid ammonia batteries at subzero temperatures, whereas the performance of batteries utilizing aqueous electrolytes greatly deteriorates at subzero temperatures due to increased viscosity or freezing of the solvent.

The use of cathodes where sulfur species undergo changes in oxidation states by acting as electron-acceptors in the cathode reaction are known in the prior art as shown by U.S. Pat. Nos. 2,689,876; 3,082,284 and 3,121,028. However, the use of sulfur species as electron-acceptors is quite different from the present invention, using a silver sulfide cathode, where monovalent silver atoms act as electron-acceptors. Also, the use of silver sulfide as a consumable cathode in liquid ammonia batteries is in direct contrast with the use of $Ag_2O$ and $Ag_2S$ as catalysts for other electrode reactions in aqueous electrolytes as can be found in U.S. Pat. No. 3,386,859. Materials which function as catalysts do not get consumed by the reaction or undergo any net changes in oxidation states. The silver sulfide or silver polysulfide in the instant invention in consumed in the cathodic reaction and has no catalytic function as such. Other metallic sulfide compounds do not have the unique properties in liquid ammonia as do silver sulfides.

Liquid ammonia batteries generally use soluble cathode materials such as m-dinitrobenzene. The performance of these batteries is limited by the rate and extent of the solubility of the cathode material. Also, some of the dissolved cathode material may be lost by undesired side reactions or by chemical reaction with the anode material. Furthermore, the performance of a soluble cathode material can be limited by mass movement to the electrode surface, by the active electrode surface area available and by electrosorption onto the electrode. These limitations do not exist when the insoluble, electronically conducting silver sulfide cathode of this invention is used in liquid ammonia batteries.

SUMMARY OF THE INVENTION

Electrochemical studies of silver sulfide in acid liquid ammonia electrolyte solutions over the temperature range of +20° to −50°C show that silver sulfide is a useful cathode material at low temperatures. The acidity of the liquid ammonia electrolyte is determined by the ammonia ($NH_4^+$) ion concentration. The $NH_4^+$ ion is a proton donor and hence acts as an acid in liquid ammonia. $NH_4^+$ in liquid ammonia corresponds to $H_3O^+$ in water. The maximum theoretical coulombic efficiency of two electrons per silver sulfide molecule can be obtained as predicted from the reaction $$Ag_2S + 2e^- \rightleftarrows 2Ag + S^= \qquad [1]$$

where each monovalent silver atom is reduced to the zero oxidation state. The electrochemical reduction of silver sulfide in liquid ammonia solutions shows that even at subzero temperatures the reactions rates are high. By contrast, the direct reduction of elemental sulfur on platinum and many other metals which do not readily form the metallic sulfides becomes too slow at subzero temperatures due to mass transport and kinetic limitations. Insoluble, electronically conducting silver sulfide is therefore unique as a useful, rechargeable cathode material for use in low temperature batteries and fuel cells.

The high solubility of sulfur in ammonia makes it convenient to produce silver sulfide by the direct chemical reaction in solution $$2Ag + S \rightarrow Ag_2S \qquad [2]$$

since silver combines directly with the dissolved sulfur, even in the cold to form silver sulfide cathode material. Addition of $H_2S$ aids the rate of solution of the sulfur in liquid ammonia, renders the sulfur in a reactive form and also makes it possible to produce silver sulfide electrochemically by the reverse of reaction [1].

Anodes that can be used with the silver sulfide cathode in liquid ammonia at low temperatures include magnesium and other active metals such as lithium. A concentrated solution of lithium in ammonia consisting primarily of the compound tetrammine-lithium and represented by $Li(NH_3)_4$ can also be used as the anode material. Near room temperatures or above, hydrazine can be used as the anode material oxidized at the anode. A hydrazine anode is disclosed in the aforementioned copending patent application, Ser. No. 98,117, which teaches the electrochemical oxidation of hydrazine in liquid ammonia.

STATEMENT OF THE OBJECTS OF THE INVENTION

The primary object of the present invention is to provide a rechargeable silver sulfide cathode for liquid ammonia batteries and fuel cells.

A further object is to show that properties such as the insolubility of silver sulfide in liquid ammonia, the solubility of sulfur and the effect of adding $H_2S$, the electronic conductivity of silver sulfide, and the reversibility of the electrochemical reaction involving silver sulfide give the silver sulfide cathode of this invention unique advantages over the prior type cathode materials being used in liquid ammonia batteries. Another object of this invention is to show that the present silver sulfide cathode can indeed be used at the subzero temperatures made possible by the use of liquid ammonia electrolytes.

Other objects, advantages and novel features of the invention will become apparent from the following detailed description of the invention when considered in conjunction with the accompanying drawings wherein:

BRIEF DESCRIPTION OF THE DRAWINGS

For a fuller understanding of the invention, the following description should be read in conjunction with the drawings in which.

DESCRIPTION OF THE PREFERRED EMBODIMENT

The chemicals used for experimental purposes include Matheson N.F. sublimed powder sulfur, Baker reagent $NH_4NO_3$ and $LiNO_3$, and Matheson anhydrous ammonia (99.99%), each used without further purification.

Rate of Solution

Although sulfur is soluble in ammonia solutions in excess of 30% by weight (10 M), the rate of solution is often slow; for example, in attempting to prepare a 0.1 M sulfur solution in concentrated $NH_3$—$LiNO_3$ a dichroic blue-red solution formed which changed gradually to a yellow solution, but some of the sulfur remained undissolved even after ten days. During potentiostatic reduction, the color of this solution changed to a deep brownish red, and the excess sulfur dissolved. When $H_2S$ is present, even in low concentrations, however, the rate of solution of sulfur in ammonia is very rapid.

Screening of Materials

The electrochemical reactions of sulfur-$H_2S$ solutions in acid liquid ammonia depend markedly on the nature of the metal used. Many metals tested (Ti, Zr, Hf, Th, Nb, Ta, Al, Ga, and In) do not form the sulfides in the sulfur-$H_2S$ solutions and are completely useless for any electrochemical reaction of the sulfur solutions. Many other metals (Pt, Pd, Ir, Rh, Re, Au, W, Mo, V, Co, Ni) can be used as electrodes for electrochemical reaction of the sulfur solutions, but they do not form the desired sulfide compounds in the ammonia solutions. Although insoluble sulfide compounds are formed by the reactions of Hg, Cu, Pb, and Sn with the sulfur solutions, these metallic sulfides do not have the attractive properties claimed for silver sulfide. These other metallic sulfides do not adhere as well to the surface of the metal as does silver sulfide, they are not as good as silver sulfide as electrical conductors, and their electrochemical potentials and reaction rates are less favorable than those observed for silver sulfide.

The results for the various metals are summarized in Table I by listing the metal at the potential (to the nearest 0.1V) where the oxidation and reduction currents due to sulfur or $H_2S$ attain a value of 2 mA/cm² when the sweep rate is 125 mV/sec. Oxidation is represented above and reduction below the center horizontal line.

Table I

Sulfur reactivity on various metals in $NH_3$—$NH_4NO_3$ at 20°C from cyclic voltametric experiments.

| | Sn | Cu Pb | Fe | Ag Hg | Co | Ni | | | Au V Mo W Re Rh Ir Pd Pt |
|---|---|---|---|---|---|---|---|---|---|
| Oxidation ↑ | | | | | | | | | |
| | Sn Pb Cu | | | Hg Ag Ni Co | Au Pt Pd Ir Rh Re W Mo V | | | | |
| Reduction | | | | | | | | | |
| Potential vs. Pb/Pb(NO₃)₂, V | -0.6 | -0.5 | -0.4 | -0.3 | -0.2 | -0.1 | 0 | 0.1 | 0.2 0.3 |

Figure 1:
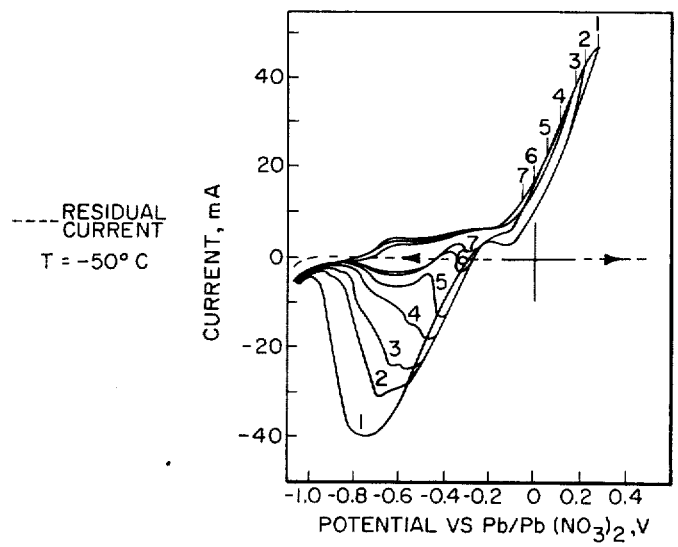
FIG. 1 shows cyclic voltammograms for 0.1M sulfur, $H_2S$ solution in $NH_3$—1M $NH_4NO_3$ at $-50°C$ on silver wire electrode as a function of the anodic potential sweep limit. Silver sulfide is formed during the anodic sweep and reduced during the cathodic sweep.

FIG. 1 shows cyclic voltammograms for a 0.1 M sulfur, $H_2S$ solution in $NH_3$—1M $NH_4NO_3$ at $-50°C$, using a silver electrode of 0.3 cm² geometrical area.

Constant current experiments

Figure 2:
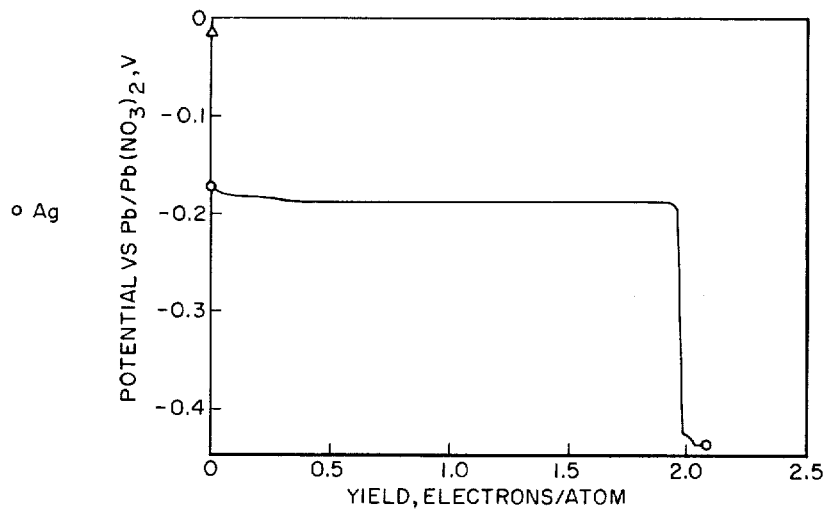
FIG. 2 shows a typical curve for the constant current reduction of sulfur, $H_2S$ solutions in stirred $NH_3$—$NH_4NO_3$ at 15°C on silver electrodes of about 50cm² geometrical area, (I = 1.00mA).

A typical curve for the constant current reduction of sulfur in stirred acid ammonia solutions at 15°C on silver electrodes is shown in FIG. 2. A sharp inflection in potential is observed when 2 electrons are consumed in the reaction per atom of sulfur initially present. This indicates that there are no detrimental side reactions or decomposition of the reactant. Similar studies on silver at $-10°C$ gave approximately the same results as obtained at $+15°C$, showing that this high coulombic efficiency does not decrease appreciably with decreasing temperature.

Neutral solutions

The foregoing results favor acid ($NH_4NO_3$) ammonia solutions to which $H_2S$ was added to accelerate the rate of solution of the sulfur. Acidity is determined by the ammonium ($NH_4^+$) ion concentration in liquid ammonia. The results are quite different for sulfur dissolved in neutral ($LiNO_3$) ammonia solutions where no $H_2S$ is used. Cyclic voltametric experiments on the sulfur dissolved in neutral liquid ammonia showed little evidence for any electrochemical oxidation or reduction of sulfur or sulfide compounds. Constant current and potentiostatic experiments in stirred neutral ammonia solutions showed similar negative results. Addition of $Li_2S$ produced no change in these experiments, but the addition of $H_2S$ quickly rendered the sulfur reactive.

These very different effects of $Li_2S$ and $H_2S$ on the sulfur solution in neutral ammonia supports the concept that $H_2S$ in ammonia forms a hydrogen-bonded species, $[SHNH_3]^-$, but produces no free sulfide ions, while sulfide ions added to ammonia do not undergo ammonolysis to $HS^-$. Apparently $H_2S$ forms the species $[SHNH_3]^-$ and $NH_4^+$ which are necessary to render the dissolved sulfur in a reactive form. Dissolved sulfur species in liquid ammonia apparently differ greatly in properties from dissolved sulfur species in aqueous solutions. The reactive forms of sulfur in the liquid ammonia containing $H_2S$ probably are complex polysulfides since solutions of sulfur and $H_2S$ in liquid ammonia have been shown to produce polysulfides, and the compound $(NH_4)_2S_5$ has been isolated.

Experimental Tests

Both $Ag_2S$ and $PtS$, like most sulfides of the electrode metals tested, are black compounds which are insoluble in liquid ammonia and therefore readily detectable if formed in significant amounts. During the electrochemical studies on platinum of the sulfur-$H_2S$ solutions in liquid ammonia, the platinum electrodes maintain a bright, metallic luster indicating very little buildup of any metallic sulfide compounds. However, when a silver electrode remains at open circuit in the sulfur-$H_2S$ solution, or during electrochemical oxidation of the solution on silver, the silver electrode becomes black, indicating formation of $Ag_2S$ from the chemical reaction

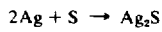  [2]

or from the electrochemical reaction

  [1]

Constant current coulometry experiments show that the electrochemical oxidation of ammonia-$H_2S$ solutions on silver produces insoluble products which can be quantitatively reduced. An acid ammonia solution saturated with $H_2S$ was oxidized on silver for 1,800 sec at 0.500mA, turning the electrode black. The solution was then stirred for 30 min to allow any soluble sulfur products to dissolve, then the electrode was transferred to a separate compartment with fresh electrolyte. Reduction at the same current, 0.500 mA, produced a gradual fading of the black color with a sharp inflection in potential after 1,815 sec, indicating that the silver was first oxidized to insoluble $Ag_2S$ and then the insoluble sulfide formed was quantitatively reduced.

Figure 3:
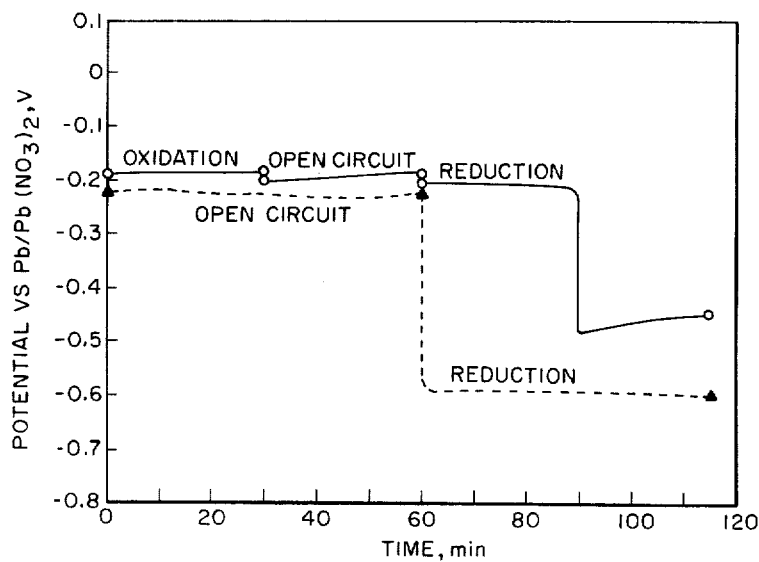
FIG. 3 shows constant current coulometry experiments at 15°C on silver in $NH_3$—$NH_4NO_3$ solutions containing $H_2S$ using constant currents of 0.500 mA; 2cm² electrode area. Silver sulfide is formed during oxidation and is then later quantitatively reduced.

FIG. 3 shows the results of the constant current coulometry experiment at 15°C in an ammonia solution containing $H_2S$. Silver electrodes of 2 cm$^2$ geometrical area were used, the reference electrode was $Pb/Pb(NO_3)_2$, saturated, and $NH_4NO_3$ was used as the electolyte salt. The control electrode showed that no electrochemical reduction is observed without first forming silver sulfide. This important experiment shows that the electrochemical reaction

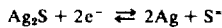  [1]

is completely reversible, demonstrates that silver sulfide can be quantitatively reduced in liquid ammonia, and shows that silver sulfide is insoluble in liquid ammonia. These are very important characteristics of this invention. Similar tests on platinum showed oxidation of the ammonia-$H_2S$ solution at about 0.0V with the electrode remaining bright. Reduction in a separate compartment showed only hydrogen evolution, indicating that no insoluble platinum sulfide compounds were formed on the platinum electrode during oxidation of the ammonia-$H_2S$ solution.

The very different peak potentials and peak currents observed in cyclic voltametric experiments on platinum and silver reflect the different nature of the sulfur reactions with these two metals. Sulfur atoms undergo the changes in oxidation states during the electrochemical reaction on platinum, while silver atoms undergo the changes in oxidation states when silver metal is used.

On the silver electrode, formation of the electronically conducting $Ag_2S$ greatly increases the effective electrode area, resulting in higher currents. The peak currents on the silver electrode in sulfur-$H_2S$ solutions are quite insensitive to the bulk sulfur concentration; also the number of coulombs involved in the reaction peaks are independent of the potential sweep rate, indicating that we are essentially observing reaction [1] involving insoluble $Ag_2S$. The reversibility of this reaction indicates use of $Ag_2S$ as a rechargeable cathode in liquid ammonia batteries or fuel cells. FIG. 1 indicates that reaction [1] occurs readily even at −50°C, indicating good performance of the $Ag_2S$ cathode at subzero temperatures.

As aforementioned, FIG. 1 shows cyclic voltammograms for a 0.1 M sulfur, $H_2S$ solution in $NH_3$—1M $NH_4NO_3$ at −50°C, using a silver electrode of 0.3 cm$^2$ geometrical area. A potential sweep rate of 100 mV/sec was used. Positive current represents oxidation and negative current reduction. The numbered vertical lines represent the potential at which the anodic sweep was reversed, while the numbered curves indicate the corresponding cathodic sweep. The resulting curves show that the amount of material reduced corresponds to the amount of material oxidized. During the anodic sweep, a blackening of the electrode is observed (silver sulfides forming) which lightens during the cathodic sweep (silver sulfide being reduced). This experiment demonstrates that silver sulfide can be reduced at temperatures as low as −50°C, and that even at this extreme subzero temperature the electrochemical reaction is reversible. Therefore, this invention can be practiced in liquid ammonia batteries operating at subzero temperatures.

This invention is the first demonstration that silver sulfide has attractive applications as the cathode material in liquid ammonia batteries. The principal advantages of this invention over cathode materials now in use are:

Silver sulfide is insoluble in liquid ammonia. The silver sulfide cathode material can therefore be retained on the electrode surface where it is most useful. This eliminates the need of diaphragms, separators, binders, or grids to confine the active material, and also prevents loss of the material by undesired reactions such as chemical reaction with the fuel or anode. Furthermore, mass transport and electrosorption limitations are avoided with this insoluble silver cathode.

As indicated above, silver sulfide can be formed under proper conditions by direct reaction of silver with sulfur dissolved in liquid ammonia. The blackening of silver due to $Ag_2S$ formation is readily observed when it is immersed in a sulfur-ammonia solution containing $H_2S$. This would not be possible in many other solvents in which sulfur is not soluble.

Silver sulfide is electronically conducting, hence, the cathode material itself serves to greatly increase the effective surface area of reaction.

The electrochemical reaction of silver sulfide is reversible. This cathode material, therefore, can be used in rechargeable batteries or fuel cells.

The silver sulfide cathode in liquid ammonia can be used at subzero temperatures.

Present cathode materials do not have all five of these distinct advantages; in fact, many have only one or two of the advantages listed above.

Modifications

Another embodiment of this invention is to use silver polysulfide rather than silver sulfide. Solutions of sulfur and $H_2S$ in liquid ammonia form polysulfides, $S_x^-$, where x represents the number of sulfur atoms contained in the polysulfide ion. FIG. 1 actually shows results for the silver polysulfide cathode, $Ag_2S_x$, since the ammonia solution contained both $H_2S$ and sulfur. The results are practically identical to those obtained using only $H_2S$; in fact, polysulfides are probably formed during the reduction of the silver sufide cathode. An attraction of a liquid ammonia solution containing sulfur is that silver sulfide is produced chemically by the spontaneous reaction $2Ag + S \rightarrow Ag_2S$. The blackening of a silver electrode due to $Ag_2S$ formation is readily observed when it is immersed into a sulfur ammonia solution.

A further modification of this invention is the use of solvents other than ammonia. The performance of this silver sulfide cathode will be independent of the solvent or electrolyte salt used where the silver sulfide is insoluble in the solvent and where the electrolytic conductivity level is retained. Aqueous solutions, although being inferior for subzero temperature applications due to reduced electrolytic conductivity, would be an example of other solvents in which to use the silver sulfide cathode. Using mixed solvents, such as water-ammonia mixtures, is another example of a modification involving the solvent.

Obviously many modifications and variations of the present invention are possible in the light of the above teachings. It is therefore to be understood that within the scope of the appended claims, the invention may be practiced other than as specifically described.

I claim:

1. An electrochemical cell having an anode and a cathode and using acid acting liquid ammonia electrolytes, comprising:
   a. an insoluble, reducible cathode maerial consisting of a silver sulfide compound,
   b. said acid acting liquid ammonia electrolyte containing sulfur and $H_2S$ in solution,
   c. said silver sulfide compound being consumed in the cathodic reaction with the silver undergoing the change in oxidation state in accordance with the completely reversible reaction

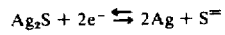
   $$Ag_2S + 2e^- \leftrightarrows 2Ag + S^=$$

d. said electronically conducting silver sulfide cathode material which is insoluble in the liquid ammonia being quantitatively reduced therein.

2. In the cell of claim 1 wherein said silver sulfide compound is in the form of a silver polysulfide.

3. In the cell of claim 1 wherein the anode is magnesium.

4. In the cell of claim 1 wherein the material oxidized at the anode is hydrazine.

5. In the cell of claim 1 wherein the material oxidized at the anode is $Li(NH_3)_4$.

* * * * *